United States Patent
Tsao et al.

(10) Patent No.: US 12,116,435 B1
(45) Date of Patent: Oct. 15, 2024

(54) VINYL ACETATE-ETHYLENE COPOLYMER AND USES OF THE SAME

(71) Applicant: DAIREN CHEMICAL CORPORATION, Taipei (TW)

(72) Inventors: Yu-Hsiang Tsao, Taipei (TW); Feng-Chuan Chang, Taipei (TW)

(73) Assignee: DAIREN CHEMICAL CORPORATION, Taipei (TW)

( * ) Notice: Subject to any disclaimer, the term of this patent is extended or adjusted under 35 U.S.C. 154(b) by 0 days.

(21) Appl. No.: 18/455,051

(22) Filed: Aug. 24, 2023

(30) Foreign Application Priority Data

Apr. 18, 2023 (TW) .................................. 112114431

(51) Int. Cl.
*C08F 218/08* (2006.01)
*C08L 31/04* (2006.01)
*C09D 7/61* (2018.01)
*C09D 131/04* (2006.01)

(52) U.S. Cl.
CPC ............ *C08F 218/08* (2013.01); *C08L 31/04* (2013.01); *C09D 7/61* (2018.01); *C09D 131/04* (2013.01); *C08L 2201/54* (2013.01); *C08L 2201/56* (2013.01)

(58) Field of Classification Search
CPC ....... C08F 218/08; C09D 7/61; C09D 131/04; C08L 31/04; C08L 2201/54; C08L 2201/56
USPC ............................................................ 524/2
See application file for complete search history.

(56) References Cited

FOREIGN PATENT DOCUMENTS

| CN | 104093679 A | 10/2014 | |
|---|---|---|---|
| CN | 108822766 A | * 11/2018 | ............ C08F 218/08 |
| WO | 2013/113152 A1 | 8/2013 | |

OTHER PUBLICATIONS

Office Action and Search Report received in Taiwan Application No. 112114431, dated Dec. 25, 2023.
Office Action and Search Report received in Taiwanese Application No. 112114431, dated Dec. 25, 2023.
Notice of Allowance received in Taiwanese Application No. 112114431, dated Mar. 14, 2024.

* cited by examiner

*Primary Examiner* — Kelechi C Egwim
(74) *Attorney, Agent, or Firm* — Greer, Burns & Crain, Ltd

(57) ABSTRACT

A vinyl acetate-ethylene (VAE) copolymer and uses of the same are provided. The vinyl acetate-ethylene (VAE) copolymer includes a structural unit derived from ethylene and a structural unit derived from vinyl acetate. The $^1$H-NMR spectrum of the vinyl acetate-ethylene (VAE) copolymer has an integral value B of signals from 0.5 ppm to 1.0 ppm and an integral value A of signals from 4.6 ppm to 5.0 ppm, and the value of B/3A ranges from 0.070 to 0.120. The $^1$H-NMR spectrum is measured by using dimethyl sulfoxide as a solvent.

14 Claims, No Drawings

VINYL ACETATE-ETHYLENE COPOLYMER AND USES OF THE SAME

CLAIM FOR PRIORITY

This application claims the benefit of Taiwan Patent Application No. 112114431 filed on Apr. 18, 2023, the subject matters of which are incorporated herein in their entirety by reference.

BACKGROUND

Field of the Invention

The present invention relates to a vinyl acetate-ethylene (VAE) copolymer (hereinafter "VAE copolymer"), especially to a VAE copolymer having a specific structure. The present invention also relates to a polymer dispersion, coating material kit and coating material composition obtained using the VAE copolymer.

Descriptions of the Related Art

Polymer cement coating material is a two-component aqueous waterproofing coating material, comprising cement (such as white cement) and a polymer emulsion and is widely used in the building industry. The waterproofing coating material is usually spread through manual operation (also called "application"); therefore, the application feel is very important. If waterproofing coating material cannot be spread evenly, the application procedure will be time-consuming and inefficient. In addition, when the waterproofing coating material is spread on the surface of a wall or beam, the sagging of the waterproofing coating material makes it difficult to apply. Thus, the anti-sagging properties of waterproofing coating material become important.

It is known that auxiliary agents (such as a poly(acrylamide) auxiliary agent) can be added to the polymer emulsion to improve the application feel and anti-sagging properties of the waterproofing coating material. However, the addition of auxiliary agents usually causes the migration of molecules in the polymer emulsion, resulting in discoloration, cracks, and blistering of the waterproofing coating material. Furthermore, in order to be applicable in cold weather (e.g., under a temperature of 0° C. to −10° C.), the waterproofing coating material must be applicable at a low temperature, and the coating obtained therefrom must have good bending resistance at a low temperature.

Given the above, there is a need for a waterproofing coating material that can have a good application feel, anti-sagging properties and bending resistance in the absence of auxiliary agents.

SUMMARY

The present invention provides a VAE copolymer, with specific $^1$H-NMR (proton nuclear magnetic resonance) features. The VAE copolymer is helpful in providing a waterproofing coating material with a good application feel, anti-sagging properties and bending resistance in the absence of auxiliary agents. Examples of the auxiliary agent include but are not limited to poly(acrylamide), a hydrophobic alkali-swellable emulsion (HASE) thickening agent, an alkali-swellable emulsion thickening agent, ethylene glycol, propylene glycol, a plasticizer, cellulose, cellulose ether, a carboxylate-based water reducing agent, and a naphthalene-based water reducing agent.

Thus, an objective of the present invention is to provide a vinyl acetate-ethylene (VAE) copolymer, comprising a structural unit derived from ethylene and a structural unit derived from vinyl acetate, wherein the $^1$H-NMR spectrum of the vinyl acetate-ethylene copolymer has an integral value B of signals from 0.5 ppm to 1.0 ppm and an integral value A of signals from 4.6 ppm to 5.0 ppm, and the value of B/3A ranges from 0.070 to 0.120, wherein the $^1$H-NMR spectrum is measured by using dimethyl sulfoxide as a solvent.

In some embodiments of the present invention, the value of B/3A ranges from 0.070 to 0.115.

In some embodiments of the present invention, the vinyl acetate-ethylene copolymer comprises a structural unit represented by the following formula (I):

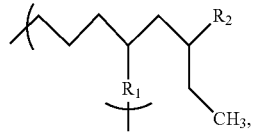

[formula 1]

in formula 1, $R_1$ is —$C_2H_4$— or

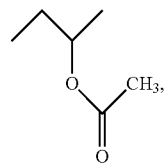

$R_2$ is H or

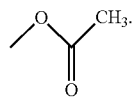

In some embodiments of the present invention, the $^1$H-NMR spectrum is obtained by using a nuclear magnetic resonance spectrometer to measure the vinyl acetate-ethylene copolymer under the following conditions: a resonance frequency ranging from 400 MHz to 700 MHz, a pulse width of 8 μsec, an acquisition time of 2 seconds, and a number of scans of 32.

In some embodiments of the present invention, the ratio of the weight average molecular weight (Mw) of the vinyl acetate-ethylene copolymer to the number average molecular weight (Mn) of the vinyl acetate-ethylene copolymer (Mw/Mn) is less than 4. Mw/Mn is from 1.0 to 3.5 in the preferred embodiments of the present invention. In the more preferred embodiments of the present invention, Mw/Mn is from 1.5 to 3.0.

Another objective of the present invention is to provide a polymer dispersion, comprising the aforementioned vinyl acetate-ethylene copolymer and a dispersion medium.

In some embodiments of the present invention, the dispersion medium comprises polyvinyl alcohol, water, hydroxyethyl cellulose (HEC), an emulsifying agent, a dispersing agent, or a combination thereof.

In some embodiments of the present invention, the polymer dispersion is an emulsion.

Another objective of the present invention is to provide a coating material kit, comprising a liquid material component and a powder material component, wherein the liquid material component comprises the aforementioned polymer dispersion, and the liquid material component and the powder material component are separated.

In some embodiments of the present invention, the powder material component of the coating material kit is selected from the group consisting of white cement, grey cement, silicate cement, quartz sand, calcium carbonate, talc powder, calcium chloride, and combinations thereof.

Still another objective of the present invention is to provide a coating material composition comprising the aforementioned polymer dispersion and a powder material component, wherein the powder material component is dispersed in the polymer dispersion.

In some embodiments of the present invention, the powder material component of the coating material composition is selected from the group consisting of white cement, grey cement, silicate cement, quartz sand, calcium carbonate, talc powder, calcium chloride, and combinations thereof.

To render the above objectives, technical features, and advantages of the present invention more apparent, the present invention will be described in detail with reference to some embodiments hereinafter.

BRIEF DESCRIPTION OF THE DRAWINGS

Not applicable.

DETAILED DESCRIPTION

Hereinafter, some embodiments of the present invention will be described in detail. However, the present invention may be embodied in various embodiments and should not be limited to the embodiments described in the specification.

Unless otherwise specified, the expressions "a," "the," or the like recited in the specification and the claims should include both singular and plural forms.

Unless it is additionally explained, the term "room temperature" recited in the specification and claims refers to 25° C., and the term "normal pressure" recited in the specification and claims refers to 1 (one) atmosphere (atm).

As used herein, the "$^1$H-NMR spectrum" is obtained using dimethyl sulfoxide as a solvent. In addition, the produced VAE copolymer is generally in the form of an emulsion. To analyze the properties of the VAE copolymer itself, the produced VAE copolymer is subjected to a pre-treatment for removing other substances, such as protective layers and aqueous ionized components, before the $^1$H-NMR analysis.

The present invention provides a waterproofing coating material that can have a good application feel, anti-sagging properties and bending resistance without needing an auxiliary agent. The VAE copolymer of the present invention and the applications thereof are described in detail below.

1. VAE COPOLYMER

The present invention provides a VAE copolymer, comprising a structural unit derived from ethylene and a structural unit derived from vinyl acetate and having a specific $^1$H-NMR spectrum. The VAE copolymer of the present invention can be obtained by copolymerizing ethylene and vinyl acetate.

1.1. Properties of VAE Copolymer

The VAE copolymer of the present invention satisfies the following conditions: in the $^1$H-NMR spectrum of the VAE copolymer, there are an integral value B of signals from 0.5 ppm to 1.0 ppm and an integral value A of signals from 4.6 ppm to 5.0 ppm. The value of B/3A ranges from 0.070 to 0.120, specifically from 0.070 to 0.115, and more specifically from 0.077 to 0.109. For example, the value of B/3A can be 0.070, 0.071, 0.072, 0.073, 0.074, 0.075, 0.076, 0.077, 0.078, 0.079, 0.080, 0.081, 0.082, 0.083, 0.084, 0.085, 0.086, 0.087, 0.088, 0.089, 0.090, 0.091, 0.092, 0.093, 0.094, 0.095, 0.096, 0.097, 0.098, 0.099, 0.100, 0.101, 0.102, 0.103, 0.104, 0.105, 0.106, 0.107, 0.108, 0.109, 0.110, 0.111, 0.112, 0.113, 0.114, 0.115, 0.116, 0.117, 0.118, 0.119, or 0.120, or within a range between any two of the values described herein. When the value of B/3A of the VAE copolymer is within the designated range of the present invention, the VAE copolymer is capable of providing a waterproofing coating material with a good application feel and anti-sagging properties.

The $^1$H-NMR spectrum of the VAE copolymer of the present invention is measured by using dimethyl sulfoxide as a solvent and using a nuclear magnetic resonance spectrometer under the following conditions: a resonance frequency ranging from 400 MHz to 700 MHz (in some embodiments, the resonance frequency is 500.15 MHz), a pulse width of 8 μsec, an acquisition time of 2 seconds, and a number of scans of 32. In general, the VAE copolymer of the present invention is in the form of an emulsion when it is just produced. Therefore, the VAE copolymer must be subjected to a pre-treatment before the $^1$H-NMR analysis. The pre-treatment can be performed as follows. First, the emulsive VAE copolymer and ultra-pure water are filled into a sample bottle to obtain a mixture in which the amount of the VAE copolymer can be 3 wt % to 10 wt %. The sample bottle is then placed into a water bath at 90° C. and stirred for 30 minutes. Next, the sample bottle is taken out and cooled to room temperature; the mixture is then taken out from the sample bottle and placed into a centrifuge tube. The centrifuge tube is then placed into a centrifugal machine to perform centrifugation. The centrifugation conditions are not particularly limited. For example, the centrifugation conditions can be 15000 rpm, 90 minutes, and 27° C. After centrifugation, the upper clear liquid layer is separated from the lower solid layer. The lower solid layer is placed into another sample bottle, and ultra-pure water is added therein to obtain a mixture in which the amount of the VAE copolymer can be 3 wt % to 10 wt %. The aforementioned steps of water bath stirring, cooling, centrifugation, and separation are repeated once, and the centrifuge tube containing the lower solid layer is then placed into liquid nitrogen until the solid in the tube is totally frozen. Next, the centrifuge tube is placed in a freeze-drying bottle and subjected to freeze-drying using a freeze-dryer for 5 days to obtain a freeze-dried VAE copolymer solid without a protective layer as a sample for $^1$H-NMR analysis. As used herein, ultra-pure water refers to water with a specific resistance of up to 18 MΩ-cm at 25° C., obtained by using the ultra-pure water system Milli-Q and using an ion exchange process, active carbon, membrane filtration to remove the major impurities in the water.

The degree of completion of the aforementioned pre-treatment can be determined by the integral value of signals from 3.8 ppm to 4.0 ppm in the $^1$H-NMR spectrum of the VAE copolymer. Thus, in some embodiments of the present invention, the $^1$H-NMR spectrum of the VAE copolymer may have an integral value C of signals from 3.8 ppm to 4.0 ppm. The ratio of the integral value C to the integral value A (C/A) is preferably less than 0.05, such as 0.04, 0.03, 0.0.2, 0.01, 0.009, 0.008, 0.007, 0.006 0.005, 0.004, 0.003, 0.002, 0.001, or 0, or within a range between any two of the values described herein.

In some embodiments of the present invention, the Mw/Mn value of the VAE copolymer is less than 4, specifically from 1.0 to 3.5, more specifically from 1.5 to 3.0, and most specifically from 2.0 to 2.5. For example, the Mw/Mn value of the VAE copolymer can be 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1, or 0, or within a range between any two of the values described herein.

The copolymers that can be manufactured by copolymerizing ethylene and vinyl acetate include VAE copolymers and ethylene-vinyl acetate copolymers (hereinafter "EVA copolymers"). The VAE copolymer and EVA copolymer can be differentiated from each other by the amount of the structural unit derived from vinyl acetate in the copolymer. Generally, when the amount of the structural unit derived from ethylene in the copolymer is 40 wt % or more, the copolymer is called an EVA copolymer. The EVA copolymer usually requires an organic solvent as a dispersion medium, and itself is in the form of a solid. When the amount of the structural unit derived from ethylene in the copolymer is less than 40 wt %, the copolymer is called a VAE copolymer. The VAE copolymer usually requires water as a dispersion medium, and is in the form of liquid.

In the preferred embodiments of the present invention, the onset glass transition temperature (hereinafter "onset Tg") of the VAE copolymer ranges from −1° C. to −20° C. For example, the onset Tg of the VAE copolymer can be −1° C., −2° C., −3° C., −4° C., −5° C., −6° C., −7° C., −8° C., −9° C., −10° C., −11° C., −12° C., −13° C., −14° C., −15° C., −16° C., −17° C., −18° C., −19° C., or −20° C., or within a range between any two of the values described herein. When the onset Tg of the VAE copolymer falls within the designated range, the waterproofing coating material prepared using the VAE copolymer is especially suitable for a low-temperature environment (e.g., an environment in which the average air temperature is 0° C. or lower). In addition, the inflection Tg of the VAE copolymer is preferably between 5° C. and −12° C. For example, the inflection Tg of the VAE copolymer can be 5° C., 4° C., 3° C., 2° C., 1° C., 0° C., −1° C., −2° C., −3° C., −4° C., −5° C., −6° C., −7° C., −8° C., −9° C., −10° C., −11° C., or −12° C., or within a range between any two of the values described herein. When the onset Tg and the inflection Tg of the VAE copolymer both fall within the designated ranges, the waterproofing coating material prepared using the VAE copolymer especially has a good bending resistance at a low temperature and can pass a flexibility test at a low temperature.

1.2. Structure of VAE Copolymer

The VAE copolymer of the present invention comprises a structural unit derived from ethylene and a structural unit derived from vinyl acetate. In some embodiments of the present invention, the VAE copolymer consists essentially of the structural unit derived from ethylene and the structural unit derived from vinyl acetate, or the VAE copolymer consists of the structural unit derived from ethylene and the structural unit derived from vinyl acetate. In some embodiments of the present invention, the VAE copolymer comprises a structural unit represented by the following formula (I).

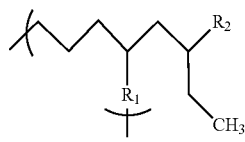

[formula 1]

In formula 1, $R_1$ is —$C_2H_4$— or

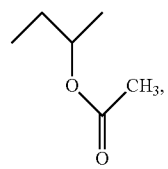

$R_2$ is H or

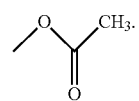

The feature of the structural unit represented by formula (I) is a branched chain connected to the main chain of the copolymer, wherein the structure of the branched chain is butyl or an ester-substituted butyl. Without being restricted by any theories, it is believed that the structural unit represented by formula (I) is formed through an intermolecular chain transfer reaction.

1.3. Production of VAE Copolymer

The VAE copolymer of the present invention can be obtained by copolymerizing vinyl acetate and ethylene. In general, the copolymerization of vinyl acetate and ethylene can be performed by a pyrolysis method or a reduction-oxidation method. For example, the reduction-oxidation method includes a premixing step, a polymerization step, a defoaming step, and an optional post-adding step. In the premixing step, polyvinyl alcohol (PVA) is firstly dissolved under a temperature of not less than 80° C. Then the dissolved PVA, an emulsifying agent, vinyl acetate monomer, an optional pH buffering agent, an optional chelating agent, and water are added into a reactor and dissolved under 25° C. to 60° C. to obtain a premixed reaction solution. In the polymerization step, the premixed reaction solution is first heated to 50° C. to 80° C. and ethylene gas is aerated into the reactor to increase the pressure to 40 kgf to 70 kgf (initial pressure). Next, after a portion of a reducing agent is added dropwise into the reactor, a portion of an oxidizing agent is added dropwise into the reactor to perform a preliminary reaction for 2 to 4 hours. Afterwards, the pressure is further increased by 5 kgf from the initial pressure, and the aeration of ethylene gas is continued. The remaining reducing agent, oxidizing agent, and vinyl acetate monomer are added dropwise for 1 (one) hours to 8 hours to perform a polymerization reaction. After the completion of the dropwise addition, the aeration of ethylene gas is stopped, and the reactor is allowed to equilibrate to room temperature and normal pressure. In the defoaming step, a reducing agent and oxidizing agent are optionally added to remove the remained monomers by reacting with the monomers: then, a defoaming agent and a mildew-proofing agent are sequentially added. In the optional post-adding step, an optional post-adding auxiliary agent is added.

Examples of emulsifying agent include but are not limited to anionic emulsifying agents, cationic emulsifying agents, and nonionic emulsifying agents. Examples of anionic emulsifying agents include but are not limited to C8 to C18 alkyl sulfate, alkyl ether sulfate having a C8 to C18 hydrophobic group and at most 40 ethylene oxide units or 40 propylene oxide units or alkyl aryl ether sulfate having a C8 to C18 hydrophobic group and at most 40 ethylene oxide units or 40 propylene oxide units, C8 to C18 alkyl sulfonate or C8 to C18 alkyl aryl sulfonate, and esters or half-esters of sulfosuccinic acid and monohydric alcohol or an alkyl phenol. Examples of nonionic emulsifying agents include but are not limited to alkyl polyethylene glycol ether having 8 to 40 ethylene oxide units or alkylaryl polyethylene glycol ether having 8 to 40 ethylene oxide units. Specific examples of the nonionic emulsifying agents include but are not limited to C6 to C12 alkylphenol ethoxylates and ethylene oxide/propylene oxide block copolymer. Based on the total weight of the VAE copolymer, the amount of the emulsifying agent can be 0.1 wt % to 5.0 wt %, such as 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.5 wt %, 2.0 wt %, 2.5 wt %, 3.0 wt %, 3.5 wt %, 4.0 wt %, 4.5 wt %, or 5.0 wt %, or within a range between any two of the values described herein.

Examples of the chelating agent include but are not limited to ethylenediaminetetraacetic acid (EDTA) and salts thereof, diethylenetriaminepentaacetic acid (DTPA) and salts thereof, N-(2-hydroxyethyl)ethylenediaminetriacetic acid (HEDTA) and salts thereof, nitrilotriacetic acid (NTA) and salts thereof, 2,3-dimercaptosuccinic acid (DMSA) and salts thereof, N,N-dicarboxymethyl glutamic acid tetrasodium salt (GLDA), trisodium dicarboxymethyl alaninate (MGDA), ethanoldiglycinic acid disodium salt (EDG), and glucoheptonic sodium salt. The aforementioned chelating agents can be used alone or in combination. Based on the total weight of the VAE copolymer, the amount of the chelating agent can be 1 ppm to 1 wt %, such as 1 ppm, 10 ppm, 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, or 1 wt %, or within a range between any two of the values described herein.

Examples of the oxidizing agent include but are not limited to hydrogen peroxide, tert-butyl peroxides (such as tert-butyl hydroperoxide), potassium persulfate, sodium persulfate, ammonium persulfate, potassium peroxydiphosphate, benzoyl peroxide, lauryl peroxides, zinc peroxide, tert-butyl peroxypivalate, cumene hydroperoxide, and azobisisobutyronitrile. The aforementioned oxidizing agents can be used alone or in combination. Based on the total weight of the VAE copolymer, the amount of the oxidizing agent can be 0.01 wt % to 8 wt %, such as 0.01 wt %, 0.05 wt %, 0.1 wt %, 0.5 wt %, 1 wt %, 2 wt %, 3 wt %, 4 wt %, 5 wt %, 6 wt %, 7 wt %, or 8 wt %, or within a range between any two of the values described herein.

Examples of the reducing agent include but are not limited to the following: sulfites of alkali metals or ammonium or bisulfites of alkali metals or ammonium (e.g., sodium sulfite); derivatives of subsulfate, such as zinc formaldehyde sulfoxylate or sodium formaldehyde sulfoxylate: sulfinic acid and salts thereof, such as 2-hydroxy-2-sulfinatoacetic acid, 2-hydroxy-2-sulfinatoacetic acid disodium salt, 2-hydroxy-2-sulfinatoacetic acid zinc salt, or 2-hydroxy-2-sulfinatopropionic acid disodium salt: ascorbic acid and salts thereof, such as sodium ascorbate: erythorbic acid and salts thereof, such as sodium erythorbate; and tartaric acid. The aforementioned reducing agents can be used alone or in combination. The preferred embodiments of the reducing agents include sulfinic acid and salts thereof, ascorbic acid and salts thereof, and erythorbic acid and salts thereof. Based on the total weight of the VAE copolymer, the amount of the reducing agent can be 0.01 wt % to 2 wt %, such as 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, or 2 wt %, or within a range between any two of the values described herein.

Examples of the defoaming agent include but are not limited to mineral oil-based defoaming agents, higher aliphatic alcohol-based defoaming agents, polyether-based defoaming agents, and organosilicon-based defoaming agents. The aforementioned defoaming agents can be used alone or in combination. The preferred embodiments of the defoaming agents include mineral oil-based defoaming agents, which use mineral oil (e.g., white oil, diesel oil, or kerosine) as a carrier to carry hydrophobic substance (e.g., fatty acid, fatty acid metal soap, fatty acid amide, or higher aliphatic alcohol) as a defoaming subject. Examples of the mildew-proofing agent include but are not limited to 1,2-benzisothiazolin-3-one (BIT), 2-methyl-4-isothiazolin-3-one-based mildew-proofing agent, isothiazolinone, and LXE bactericide.

Examples of the post-adding auxiliary agent include but are not limited to lignosulfonate-based water-reducing agents, naphthalene-based water-reducing agents, melamine-based water-reducing agents, aminosulfonate-based water-reducing agents, fatty acid-based water-reducing agents, and polycarboxylate-based water-reducing agents. The aforementioned post-adding auxiliary agents can be used alone or in combination. Based on the total weight of the emulsion including the VAE copolymer, the amount of the post-adding auxiliary agent can be 0 wt % to 5 wt %, such as 0 wt %, 0.1 wt %, 0.5 wt %, 1 wt %, 1.5 wt %, 2 wt %, 2.5 wt %, 3 wt %, 3.5 wt %, 4 wt %, 4.5 wt %, or 5 wt %, or within a range between any two of the values described herein.

Examples of the catalyst include but are not limited to copper sulfate and ethylenediamine tetraacetic acid.

In the VAE copolymer of the present invention, the B/3A value can be adjusted by controlling one or more of the following factors: (1) the holding time of ethylene gas; (2) the amount of the vinyl acetate monomer added in the pre-mixing step; (3) the amount of the vinyl acetate monomer added in the reaction step; (4) the rate of adding vinyl acetate dropwise in the reaction step; and (5) the amount or type of the chelating agent.

In addition, to reduce volatile organic compounds (VOC), it is preferred that the emulsion of the VAE copolymer of the present invention is substantially free of organic solvents, meaning that, based on the total weight of the VAE copolymer emulsion, the amount of the organic solvents is not larger than 1000 ppm.

2. APPLICATIONS OF VAE COPOLYMER

The VAE copolymer of the present invention can be in the form of an emulsion when it is produced. Therefore, the present invention also provides a polymer dispersion, comprising the aforementioned VAE copolymer and a dispersion medium, and the VAE copolymer is dispersed in the dispersion medium. Examples of the dispersion medium include but are not limited to polyvinyl alcohol, water, hydroxyethyl cellulose (HEC), an emulsifying agent, and a dispersing agent. The aforementioned dispersion media can be used alone or in combination.

The polymer dispersion of the present invention can be mixed with a powder material to form a coating material, such as a waterproofing coating material. Thus, the present invention also provides a coating material composition, comprising the aforementioned polymer dispersion and a powder material component, wherein the powder material component is dispersed in the polymer dispersion. Examples of the powder material component include but are not limited to white cement, grey cement, silicate cement, quartz sand, calcium carbonate, talc powder, and calcium chloride. The aforementioned powder material components can be used alone or in combination. The VAE copolymer of the present invention is especially suitable for forming a waterproofing coating material with white cement. When the waterproofing coating material comprises the VAE copolymer of the present invention as a polymer dispersion, it can provide a good application feel, anti-sagging properties and low-temperature bending resistance in the absence of auxiliary agents, thereby suitable for various commercial applications.

In general, the polymer dispersion and the powder material component can be packaged and stored separately and mixed at a desired ratio before use. Therefore, the present invention also provides a coating material kit, comprising a liquid material component and a powder material component, and the liquid material component and the powder material component are separated. The liquid material component comprises the aforementioned polymer dispersion, and the powder material component can be selected from the aforementioned group.

3. EXAMPLE

3.1. Testing Methods

The present invention is further illustrated by the embodiments hereinafter, wherein
the testing instruments and methods are as follows.
[$^1$H-NMR Analysis]

First, the emulsive VAE copolymer and ultra-pure water are filled into a sample bottle to obtain a mixture (the amount of the VAE copolymer in the mixture is 3 wt % to 10 wt %). The sample bottle is then placed into a water bath at 90° C. and stirred for 30 minutes. Next, the sample bottle is taken out and cooled to room temperature; the mixture is then taken out from the sample bottle and placed into a centrifuge tube, and the centrifuge tube is placed into a centrifugal machine to perform centrifugation. The centrifugation conditions are as follows: 15000 rpm, 90 minutes, and 27° C. After centrifugation, the upper clear liquid layer is separated from the lower solid layer. The lower solid layer is placed into another sample bottle, and ultra-pure water is added therein to obtain a mixture (wherein the amount of the VAE copolymer is 3 wt % to 10 wt %). The aforementioned steps of water bath stirring, cooling, centrifugation, and separation are repeated once; and the centrifuge tube containing the lower solid layer is then placed into liquid nitrogen until the solid in the tube is totally frozen. Next, the centrifuge tube is placed in a freeze-drying bottle and subjected to freeze-drying by using a freeze-dryer for 5 days to obtain a freeze-dried VAE copolymer solid without a protective layer.

Next, the VAE copolymer solid is dissolved in dimethyl sulfoxide to obtain a test sample solution with a concentration ranging from 2 wt % to 10 wt %. The $^1$H-NMR spectrum is obtained using a nuclear magnetic resonance spectrometer (model no.: BRUKER AV-500). The measuring conditions are as follows: a resonance frequency of 500.15 MHz, a pulse width of 8 μsec, an acquisition time of 2 seconds, and a number of scans of 32. In the appended examples, the concentration of the test sample solution is 2 wt %.

[Fluidity Test]

First, 43.2 parts by weight of the emulsive VAE copolymer (amount of VAE copolymer: 55 wt %) which is just produced, 54.5 parts by weight of white cement powder material (model no.: JSA-101, available from Beijing Oriental Yuhong Waterproof Technology Co., Ltd.) and 2.3 parts by weight of water are mixed under stirring at a rotational speed of 1000 rpm. A well-mixed sample of coating material composition is obtained. Next, in accordance with the standard of JIS R5201, a fluidity measuring cup is filled with the sample. The fluidity measuring cup is then vertically moved so the sample uniformly flows outward concentrically. After 15 seconds are counted, the diameter of the concentric circle is measured. Three samples are tested, and the diameters of the concentric circles are averaged to obtain a fluidity value at 0 hours. The unit of the fluidity value is "mm".

The fluidity of the sample that has been rested for 2 hours and the fluidity of the sample that has been rested for 4 hours are respectively measured in accordance with the aforementioned method to obtain the fluidity value at 2 hours and the fluidity value at 4 hours. The unit of the fluidity values is "mm".

[Application Feel Test]

First, 43.2 parts by weight of the emulsive VAE copolymer (amount of VAE copolymer: 55 wt %) which is just produced, 54.5 parts by weight of white cement powder material JSA-101 and 2.3 parts by weight of water are mixed under stirring at a rotational speed of 1000 rpm. A well-mixed sample of coating material composition is obtained. Next, the sample is poured into a beaker and stirred evenly again. The viscosity of the sample is measured by using a Brookfield viscometer (model no.: DV2T, available from Today's Instruments Co., Ltd.). The measuring conditions are as follows: the spindle is E95, the rotational speed is 60 rpm, and the rotational time is 30 seconds. A viscosity value at 0 hours under a rotational speed of 60 rpm represents the application feel at 0 hours. The unit of the viscosity value is "cP".

The viscosity of the sample that has been rested for 2 hours and the viscosity of the sample that has been rested for 4 hours are respectively measured in accordance with the aforementioned method to obtain the viscosity value at 2 hours under a rotational speed of 60 rpm and viscosity value at 4 hours under a rotational speed of 60 rpm, which respectively represent the application feel at 2 hours and application feel at 4 hours. The unit of the viscosity values is "cP".

[Anti-Sagging Properties Test]

First, 43.2 parts by weight of the emulsive VAE copolymer (amount of VAE copolymer: 55 wt %) which is just produced, 54.5 parts by weight of white cement powder material JSA-101 and 2.3 parts by weight of water are mixed under stirring at a rotational speed of 1000 rpm. A well-mixed sample of coating material composition is obtained. Next, the sample is poured into a beaker and stirred evenly again, and the sample's viscosity is measured using a Brookfield viscometer. The measuring conditions are as follows: the spindle is E95, the rotational speed is 6 rpm, and the rotational time is 30 seconds. A viscosity value at 0 hours under a rotational speed of 6 rpm represents the anti-sagging property at 0 hours. The unit of the viscosity value is "cP".

The viscosity of the sample that has been rested for 2 hours and the viscosity of the sample that has been rested for 4 hours are respectively measured in accordance with the aforementioned method to obtain the viscosity value at 2 hours under a rotational speed of 6 rpm and viscosity value at 4 hours under a rotational speed of 6 rpm, which respectively represent the anti-sagging property at 2 hours and the anti-sagging property at 4 hours. The unit of the viscosity values is "cP".

[Tg Measurement]

First, 20 mg of the VAE copolymer is placed in an oven at 80° C. for 3 hours. The dried VAE copolymer is pressed into a specimen with a diameter of 5 mm and a thickness of 1 (one) mm. The specimen is then put into a differential scanning calorimeter (DSC) (model no.: DSC 250, available from Waters Corporation). The obtained DSC curve can be determined using the software (TRIOS, version V5) affixed to the instrument to obtain the onset Tg and inflection Tg of the VAE copolymer.

[Bending Resistance Test Under Low Temperature]

First, three specimens of 100 mm×25 mm are prepared in accordance with the National Standards of the People's Republic of China GB/T 23445-2009, Sections 7.4.2 and 7.5. Next, the specimens are subjected to the bending properties test under low temperature that is performed in accordance with GB/T 16777-2008, Section 13.2.1, wherein the diameter of the round bar is 10 mm, and the specified temperature is −10° C. The judgement criteria are as follows: the specimen passes the bending resistance test under low temperature when no cracks are observed, and the specimen fails in the bending resistance test under low temperature when cracks are observed.

3.2. Preparation of VAE Copolymer

Synthesis Example 1

First, 88 g of PVA was dissolved at 88° C. Next, the dissolved PVA, 25.1 g of fatty alcohol polyoxyethylene ether (model no.: 6530, available from Rhodia Solvay Group, which is an aqueous solution of tridecanol ethoxylate with 30 ethylene oxide units and 64 wt % to 66 wt % of active matter, and has a hydrophilic-lipophilic balance (HLB) value of 17.2) as an emulsifying agent, 340 g of vinyl acetate monomer, 30 ppm of DTPA as a chelating agent, 0.06 g of copper sulfate as a catalyst, and 1832 g of water were added into a reactor, and dissolved under a temperature of 25° C. to 60° C. to obtain a pre-mixed reaction solution with a pH value of 4.8 to 5.1. The temperature of the pre-mixed reaction solution was raised to 70° C., and ethylene gas was aerated into the reactor to increase the pressure to 55 kgf. Next, after some sodium erythorbate was added as the reducing agent, some potassium persulfate was added as the oxidizing agent to perform a preliminary reaction for 0.5 hours. Afterwards, the pressure was increased to 60 kgf, and the aeration of ethylene was continued. The remaining sodium erythorbate, potassium persulfate, and 1360 g of vinyl acetate monomer were added dropwise for 5 hours to perform a polymerization reaction. After the completion of the dropwise addition, the aeration of ethylene gas was stopped, and the reactor was allowed to equilibrate to room temperature and normal pressure. The total reaction time was 8 hours, and an undefoamed product was obtained. The total amount of ethylene was 540 g, the holding time of ethylene gas was 2 hours, the total amount of potassium persulfate was 20.1 g, and the total amount of sodium erythorbate was 5.6 g. The undefoamed product was cooled to about 55° C. and put into a defoaming tank to perform defoaming. After 500 ppm of the defoaming agent (model no.: TEGO Antifoam 2290, available from Evonik) was added into the defoaming tank, the undefoamed product was stirred and rested for 30 minutes and then cooled to 20° C. to obtain the emulsive VAE copolymer of Synthesis Example 1.

Synthesis Example 2

First, 88 g of PVA was dissolved at 88° C. Next, the dissolved PVA, 25 g of fatty alcohol polyoxyethylene ether 6530 as an emulsifying agent, 340 g of vinyl acetate monomer, 10 ppm of DTPA as a chelating agent, 0.06 g of copper sulfate as a catalyst, and 1880 g of water were added into a reactor, and dissolved under a temperature of 25° C. to 60° C. to obtain a pre-mixed reaction solution with a pH value of 4.8 to 5.1. The temperature of the pre-mixed reaction solution was raised to 70° C., and ethylene gas was aerated into the reactor to increase the pressure to 55 kgf. Next, after some sodium erythorbate was added as the reducing agent, some tert-butyl peroxypivalate was added as the oxidizing agent to perform a preliminary reaction for 0.5 hours. Afterwards, the pressure was increased to 60 kgf, and the aeration of ethylene was continued. The remaining sodium erythorbate, tert-butyl peroxypivalate, and 1360 g of vinyl acetate monomer were added dropwise for 4.5 hours to perform a polymerization reaction. After the completion of the dropwise addition, the aeration of ethylene gas was stopped, and the reactor was allowed to equilibrate to room temperature and normal pressure. The total reaction time was 8 hours, and an undefoamed product was obtained. The total amount of ethylene was 600 g, the holding time of ethylene gas was 7.5 hours, the total amount of tert-butyl peroxypivalate was 20.7 g, and the total amount of sodium erythorbate was 5.75 g. The undefoamed product was cooled to about 55° C. and put into a defoaming tank to perform defoaming. After 500 ppm of the defoaming agent TEGO Antifoam 2290 was added into the defoaming tank, the undefoamed product was stirred and rested for 30 minutes and then cooled to 20° C. to obtain the emulsive VAE copolymer of Synthesis Example 2.

Synthesis Example 3

First, 88 g of PVA was dissolved at 88° C. Next, the dissolved PVA, 24.95 g of fatty alcohol polyoxyethylene ether 6530 as an emulsifying agent, 340 g of vinyl acetate monomer, 15 ppm of DTPA as a chelating agent, 0.06 g of copper sulfate as a catalyst, and 2020 g of water were added into a reactor, and dissolved under a temperature of 25° C. to 60° C. to obtain a pre-mixed reaction solution with a pH value of 4.8 to 5.1. The temperature of the pre-mixed reaction solution was raised to 70° C., and ethylene gas was aerated into the reactor to increase the pressure to 55 kgf. Next, after some sodium erythorbate was added as the reducing agent, some tert-butyl peroxypivalate was added as the oxidizing agent to perform a preliminary reaction for 0.5 hours. Afterwards, the pressure was increased to 60 kgf, and the aeration of ethylene was continued. The remaining sodium erythorbate, tert-butyl peroxypivalate, and 1360 g of vinyl acetate monomer were added dropwise for 5.5 hours to perform a polymerization reaction. After the completion of the dropwise addition, the aeration of ethylene gas was stopped, and the reactor was allowed to equilibrate to room temperature and normal pressure. The total reaction time was 8 hours, and an undefoamed product was obtained. The total amount of ethylene was 770 g, the holding time of ethylene gas was 4 hours, the total amount of tert-butyl peroxypivalate was 22 g, and the total amount of sodium erythorbate was 6.2 g. The undefoamed product was cooled to about 55° C. and put into a defoaming tank to perform defoaming. After 500 ppm of the defoaming agent TEGO Antifoam 2290 was added into the defoaming tank, the undefoamed product was stirred and rested for 30 minutes and then cooled to 20° C. to obtain the emulsive VAE copolymer of Synthesis Example 3.

Synthesis Example 4

First, 88 g of PVA was dissolved at 88° C. Next, the dissolved PVA, 24.9 g of fatty alcohol polyoxyethylene ether 6530 as an emulsifying agent, 340 g of vinyl acetate monomer, 80 ppm of DTPA as a chelating agent, 0.06 g of copper sulfate as a catalyst, and 2060 g of water were added into a reactor, and dissolved under a temperature of 25° C. to 60° C. to obtain a pre-mixed reaction solution with a pH value of 4.8 to 5.1. The temperature of the pre-mixed reaction solution was raised to 70° C., and ethylene gas was aerated into the reactor to increase the pressure to 55 kgf. Next, after some sodium erythorbate was added as the reducing agent, some potassium persulfate was added as the oxidizing agent to perform a preliminary reaction for 0.5 hours. Afterwards, the pressure was increased to 60 kgf, and the aeration of ethylene was continued. The remaining sodium erythorbate, potassium persulfate, and 1360 g of vinyl acetate monomer were added dropwise for 5.5 hours to perform a polymerization reaction. After the completion of the dropwise addition, the aeration of ethylene gas was stopped, and the reactor was allowed to equilibrate to room temperature and normal pressure. The total reaction time was 8 hours, and an undefoamed product was obtained. The total amount of ethylene was 819 g, the holding time of ethylene gas was 5 hours, the total amount of potassium persulfate was 22.7 g, and the total amount of sodium erythorbate was 6.3 g. The undefoamed product was cooled to about 55° C. and put into a defoaming tank to perform defoaming. After 500 ppm of the defoaming agent TEGO Antifoam 2290 was added into the defoaming tank, the undefoamed product was stirred and rested for 30 minutes and then cooled to 20° C. to obtain the emulsive VAE copolymer of Synthesis Example 4.

Comparative Synthesis Example 1

A product with a model no. of VINNAPAS® EP 707K available from Wacker is used.

Comparative Synthesis Example 2

First, 82 g of PVA was dissolved at 88° C. Next, the dissolved PVA and 1740 g of water were added into a reactor to obtain a pre-mixed reaction solution. The temperature of the pre-mixed reaction solution was raised to 60° C., and ethylene gas was aerated into the reactor to increase the pressure to 55 kgf. Next, 4.25 g of potassium persulfate as an oxidizing agent and 1700 g of vinyl acetate monomer were added dropwise to perform a polymerization reaction. After the completion of the dropwise addition, the aeration of ethylene gas was stopped, and the reactor was allowed to equilibrate to room temperature and normal pressure. The total reaction time was 10 hours, and an undefoamed product was obtained. The total amount of ethylene was 425 g, and the holding time of ethylene gas was 7 hours. The undefoamed product was cooled to about 55° C. and put into a defoaming tank to perform defoaming. After 500 ppm of the defoaming agent TEGO Antifoam 2290 was added into the defoaming tank, the undefoamed product was stirred and rested for 30 minutes and then cooled to 20° C. to obtain the emulsive VAE copolymer of Comparative Synthesis Example 2.

Comparative Synthesis Example 3

First, 82 g of PVA was dissolved at 88° C. Next, the dissolved PVA and 1740 g of water were added into a reactor to obtain a pre-mixed reaction solution. The temperature of the pre-mixed reaction solution was raised to 60° C., and ethylene gas was aerated into the reactor to increase the pressure to 55 kgf. Next, 4.25 g of potassium persulfate as an oxidizing agent and 1700 g of vinyl acetate monomer were added dropwise to perform a polymerization reaction. After the completion of the dropwise addition, the aeration of ethylene gas was stopped, and the reactor was allowed to equilibrate to room temperature and normal pressure. The total reaction time was 10 hours, and an undefoamed product was obtained. The total amount of ethylene was 425 g, and the holding time of ethylene gas was 3 hours. The undefoamed product was cooled to about 55° C. and put into a defoaming tank to perform defoaming. After 500 ppm of the defoaming agent TEGO Antifoam 2290 was added to the defoaming tank, the undefoamed product was stirred and rested for 30 minutes, then cooled to 20° C. Afterwards, 77.3 g of a polycarboxylate-based water-reducing agent was added as a post-adding auxiliary to obtain the emulsive VAE copolymer of Comparative Synthesis Example 3.

Comparative Synthesis Example 4

First, 70 g of PVA was dissolved at 88° C. Next, the dissolved PVA, 18 g of fatty alcohol polyoxyethylene ether 6530 as an emulsifying agent, 425 g of vinyl acetate monomer, 150 ppm of DTPA as a chelating agent, 0.06 g of copper sulfate as a catalyst, and 1740 g of water were added into a reactor, and dissolved under a temperature of 25° C. to 60° C. to obtain a pre-mixed reaction solution with a pH value of 4.8 to 5.1. The temperature of the pre-mixed reaction solution was raised to 70° C., and ethylene gas was aerated into the reactor to increase the pressure to 55 kgf. Next, after some sodium erythorbate was added as the reducing agent, some tert-butyl peroxypivalate was added as the oxidizing agent to perform a preliminary reaction for 0.5 hours. Afterwards, the pressure was increased to 60 kgf, and the aeration of ethylene was continued, the remaining sodium erythorbate, tert-butyl peroxypivalate, and 1275 g of vinyl acetate monomer were added dropwise for 2.5 hours to perform a polymerization reaction. After the completion of the dropwise addition, the aeration of ethylene gas was stopped, and the reactor was allowed to equilibrate to room temperature and normal pressure. The total reaction time was 6 hours, and an undefoamed product was obtained. The total amount of ethylene was 373 g, the holding time of ethylene gas was 1.5 hours, the total amount of tert-butyl peroxypivalate was 18.7 g, and the total amount of sodium erythorbate was 5.2 g. The undefoamed product was cooled to about 55° C. and put into a defoaming tank to perform defoaming. After 500 ppm of the defoaming agent TEGO Antifoam 2290 was added into the defoaming tank, the undefoamed product was stirred and rested for 30 minutes and then cooled to 20° C. to obtain the emulsive VAE copolymer of Comparative Synthesis Example 4.

Comparative Synthesis Example 5

First, 88 g of PVA was dissolved at 88° C. Next, the dissolved PVA, 25 g of fatty alcohol polyoxyethylene ether 6530 as an emulsifying agent, 340 g of vinyl acetate monomer, 400 ppm of DTPA as a chelating agent, 0.06 g of copper sulfate as a catalyst, and 2175 g of water were added into a reactor, and dissolved under a temperature of 25° C. to 60° C. to obtain a pre-mixed reaction solution with a pH value of 4.8 to 5.1. The temperature of the pre-mixed reaction solution was raised to 70° C., and ethylene gas was aerated into the reactor to increase the pressure to 58 kgf. Next, after some sodium erythorbate was added as the reducing agent, some tert-butyl peroxypivalate was added as the oxidizing agent to perform a preliminary reaction for 0.5 hours. Afterwards, the pressure was increased to 60 kgf, and the aeration of ethylene was continued. The remaining sodium erythorbate, tert-butyl peroxypivalate, and 1360 g of vinyl acetate monomer were added dropwise for 7 hours to perform a polymerization reaction. After the completion of the dropwise addition, the aeration of ethylene gas was stopped, and the reactor was allowed to equilibrate to room temperature and normal pressure. The total reaction time was 8 hours, and an undefoamed product was obtained. The total amount of ethylene was 956 g, the holding time of ethylene gas was 9 hours, the total amount of tert-butyl peroxypivalate was 24 g, and the total amount of sodium erythorbate was 6.64 g. The undefoamed product was cooled to about 55° C. and put into a defoaming tank to perform defoaming. After 500 ppm of the defoaming agent TEGO Antifoam 2290 was added into the defoaming tank, the undefoamed product was stirred and rested for 30 minutes and then cooled to 20° C. to obtain the emulsive VAE copolymer of Comparative Synthesis Example 5.

3.3. Properties of VAE Copolymer

The $^1$H-NMR spectrum, onset Tg and inflection Tg of the VAE copolymer of Synthesis Examples 1 to 4 and Comparative Synthesis Examples 1 to 5 were measured according to the aforementioned testing methods, and the B/3A values were calculated. The results are listed in Table 1.

TABLE 1

Properties of VAE copolymer of Synthesis Examples 1 to 4 and Comparative Synthesis Examples 1 to 5

| Unit | | B/3A value | Onset Tg ° C. | Inflection Tg ° C. |
|---|---|---|---|---|
| Synthesis Example | 1 | 0.077 | −6.7 | −2.6 |
| | 2 | 0.084 | −8.9 | −2.6 |
| | 3 | 0.109 | −15.6 | −9.5 |
| | 4 | 0.101 | −17 | −9.3 |
| Comparative Synthesis Example | 1 | 0.034 | 2.0 | 6.0 |
| | 2 | 0.030 | 0 | 8 |
| | 3 | 0.023 | 0 | 8 |
| | 4 | 0.036 | 0 | 8 |
| | 5 | 0.140 | −22.2 | −15 |

As shown in Table 1, the B/3A values of the VAE copolymer of the present invention fall within the designated range of 0.070 to 0.120. In addition, the onset Tg and inflection Tg of the VAE copolymer of the present invention fall within the range of −1° C. to −20° C., and the differences between the onset Tg and inflection Tg are less than 8° C. This indicates that the VAE copolymer of the present invention can be utilized in a low-temperature environment and has good bending resistance at a low temperature. By contrast, Comparative Synthesis Examples 1 to 4 show that the VAE copolymer, which does not belong to the present invention, has an onset Tg larger than 0° C. and an inflection Tg larger than 0° C. This indicates that such VAE copolymer is unsuitable for a low-temperature environment and does not have a good bending resistance at a low temperature.

3.4. Preparation and Test of Coating Material Composition

Coating material compositions of Examples 1 to 4 and Comparative Examples 1 to 5 were prepared using the VAE copolymers of Synthesis Examples 1 to 4 and Comparative Synthesis Examples 1 to 5. Specifically, 43.2 parts by weight of the emulsive VAE copolymer, 54.5 parts by weight of white cement powder JSA-101 and 2.3 parts by weight of water were mixed under stirring at a rotational speed of 1000 rpm to obtain a well-mixed coating material composition.

The properties of the coating material compositions of Examples 1 to 4 and Comparative Examples 1 to 5, including fluidity at 0 hours, fluidity at 2 hours, fluidity at 4 hours, application feel at 0 hours, application feel at 2 hours, application feel at 4 hours, anti-sagging property at 0 hours, anti-sagging property at 2 hours and anti-sagging property at 4 hours, were measured according to the aforementioned testing methods. The results are listed in Table 2. In Table 2, 0 hours, 2 hours and 4 hours are represented by 0H, 2H and 4H, respectively.

TABLE 2

Properties of coating material composition of Examples 1 to 4 and Comparative Examples 1 to 5

| | | Fluidity | | | Application feel | | | Anti-sagging properties | | |
|---|---|---|---|---|---|---|---|---|---|---|
| | | 0H | 2H | 4H | 0H | 2H | 4H | 0H | 2H | 4H |
| Unit | | | mm | | | cP | | | cP | |
| Example | 1 | 145 | 157 | 156 | 6320 | 5430 | 5330 | 10900 | 9900 | 7500 |
| | 2 | 153 | 163 | 167 | 6100 | 5000 | 4600 | 12600 | 8600 | 7600 |
| | 3 | 152 | 162 | 166 | 5970 | 4110 | 3830 | 12300 | 8200 | 6200 |
| | 4 | 151 | 160 | 169 | 5990 | 4280 | 3710 | 15000 | 9200 | 6700 |

TABLE 2-continued

Properties of coating material composition of Examples 1 to 4 and Comparative Examples 1 to 5

| | | Fluidity | | | Application feel | | | Anti-sagging properties | | |
|---|---|---|---|---|---|---|---|---|---|---|
| | | 0H | 2H | 4H | 0H | 2H | 4H | 0H | 2H | 4H |
| Unit | | | mm | | | cP | | | cP | |
| Comparative Example | 1 | 111 | emulsion broke | emulsion broke | 13800 | emulsion broke | emulsion broke | 51000 | emulsion broke | emulsion broke |
| | 2 | 126 | emulsion broke | emulsion broke | 13300 | emulsion broke | emulsion broke | 30900 | emulsion broke | emulsion broke |
| | 3 | 144 | 156 | 147 | 7600 | 6300 | 5810 | 18700 | 12600 | 11600 |
| | 4 | 131 | 139 | 148 | 14500 | 11000 | 10330 | 29200 | 21600 | 18600 |
| | 5 | 140 | 150 | 145 | 12420 | 9100 | 10680 | 23330 | 15330 | 16100 |

In general, a coating material composition (i.e., waterproofing coating material) having the following features are deemed as having good fluidity, application feel and anti-sagging properties: a fluidity ranging from 145 mm to 180 mm, a viscosity representing application feel at 0 hours ranging from 5000 cP to 6500 cP, viscosities representing application feel at 2 hours and application feel at 4 hours ranging from 3000 cP to 5000 cP, and a viscosity representing anti-sagging properties ranging from 5000 cP to 15000 cP.

As shown in Table 2, the coating material composition provided by using the VAE copolymer with the $^1$H-NMR characteristic (i.e., a B/3A value ranging from 0.070 to 0.120) of the present invention has good fluidity, application feel and anti-sagging properties after resting for 0, 2, and 4 hours. This indicates that the VAE copolymer of the present invention can satisfy the demands in the market. By contrast, the coating material composition provided using the VAE copolymer without the $^1$H-NMR characteristic of the present invention cannot simultaneously have good fluidity, application feel and anti-sagging properties, thereby not satisfying the demands in the market.

In addition, the bending resistance under the low temperature of the coating material compositions of Examples 1 to 4 and Comparative Examples 1 to 5 was tested according to the aforementioned testing method. The results are listed in Table 3.

TABLE 3

Properties of coating material composition of Examples 1 to 4 and Comparative Examples 1 to 5

| | Example | | | | Comparative Example | | | | |
|---|---|---|---|---|---|---|---|---|---|
| | 1 | 2 | 3 | 4 | 1 | 2 | 3 | 4 | 5 |
| Bending resistance under low temperature | Pass | Pass | Pass | Pass | Fail | Fail | Fail | Fail | Fail |

As shown in Table 3, the coating material composition provided using the VAE copolymer with the $^1$H-NMR characteristic (i.e., a B/3A value ranging from 0.070 to 0.120) of the present invention can pass the bending resistance test under low temperatures. This indicates that the VAE copolymer of the present invention can be used in cold weather (e.g., an average air temperature ranging from 0° C. to −10° C.). By contrast, the coating material composition provided using the VAE copolymer without the $^1$H-NMR characteristic of the present invention cannot pass the bending resistance test under low temperatures, thereby, cannot be used in cold weather.

The above examples are used to illustrate the principle and efficacy of the present invention and show the inventive features thereof but are not used to limit the scope of the present invention. People skilled in this field may proceed with a variety of modifications and replacements based on the disclosures and suggestions of the invention as described. Therefore, the scope of protection of the present invention is as defined in the claims as appended.

What is claimed is:

1. A vinyl acetate-ethylene (VAE) copolymer, which comprises a structural unit derived from ethylene and a structural unit derived from vinyl acetate, wherein, the $^1$H-NMR spectrum of the vinyl acetate-ethylene copolymer has an integral value B of signals from 0.5 ppm to 1.0 ppm and an integral value A of signals from 4.6 ppm to 5.0 ppm, and the value of B/3A ranges from 0.070 to 0.120, wherein the $^1$H-NMR spectrum is measured by using dimethyl sulfoxide as a solvent, wherein the $^1$H-NMR spectrum is obtained by using a nuclear magnetic resonance spectrometer to measure the vinyl acetate-ethylene copolymer under the following conditions: a resonance frequency ranging from 400 MHz to 700 MHz, a pulse width of 8 μsec, an acquisition time of 2 seconds, and a number of scans of 32.

2. The vinyl acetate-ethylene copolymer of claim 1, wherein the value of B/3A ranges from 0.070 to 0.115.

3. The vinyl acetate-ethylene copolymer of claim 1, wherein the vinyl acetate-ethylene copolymer comprises a structural unit represented by the following formula (I):

[formula 1]

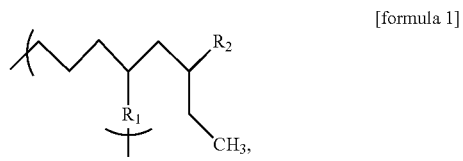

in formula 1, $R_1$ is —$C_2H_4$— or

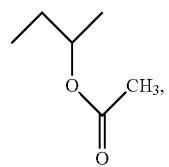

R₂ is H or

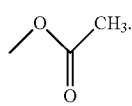

4. The vinyl acetate-ethylene copolymer of claim 1, wherein the ratio of the weight average molecular weight (Mw) of the vinyl acetate-ethylene copolymer to the number average molecular weight (Mn) of the vinyl acetate-ethylene copolymer (Mw/Mn) is less than 4.

5. The vinyl acetate-ethylene copolymer of claim 2, wherein the ratio of the weight average molecular weight (Mw) of the vinyl acetate-ethylene copolymer to the number average molecular weight (Mn) of the vinyl acetate-ethylene copolymer (Mw/Mn) is less than 4.

6. The vinyl acetate-ethylene copolymer of claim 3, wherein the ratio of the weight average molecular weight (Mw) of the vinyl acetate-ethylene copolymer to the number average molecular weight (Mn) of the vinyl acetate-ethylene copolymer (Mw/Mn) is less than 4.

7. A polymer dispersion, which comprises the vinyl acetate-ethylene copolymer of claim 1 and a dispersion medium.

8. The polymer dispersion of claim 7, wherein the dispersion medium comprises polyvinyl alcohol, water, hydroxyethyl cellulose (HEC), an emulsifying agent, a dispersing agent, or a combination thereof.

9. The polymer dispersion of claim 7, wherein the polymer dispersion is an emulsion.

10. The polymer dispersion of claim 8, wherein the polymer dispersion is an emulsion.

11. A coating material kit, which comprises a liquid material component and a powder material component, wherein the liquid material component comprises the polymer dispersion of claim 7, and the liquid material component and the powder material component are separated from each other.

12. The coating material kit of claim 11, wherein the powder material component is selected from the group consisting of white cement, grey cement, silicate cement, quartz sand, calcium carbonate, talc powder, calcium chloride, and combinations thereof.

13. A coating material composition, which comprises the polymer dispersion of claim 7 and a powder material component, wherein the powder material component is dispersed in the polymer dispersion.

14. The coating material composition of claim 13, wherein the powder material component is selected from the group consisting of white cement, grey cement, silicate cement, quartz sand, calcium carbonate, talc powder, calcium chloride, and combinations thereof.

* * * * *